(12) United States Patent
Zhang et al.

(10) Patent No.: US 12,370,616 B2
(45) Date of Patent: Jul. 29, 2025

(54) APPARATUS FOR WELDING (71) Applicant: SAINT-GOBAIN PERFORMANCE PLASTICS CORPORATION, Solon, OH (US)

(72) Inventors: Jianfeng Zhang, Shrewsbury, MA (US); Morgane A. S. Laurent, Clinton, MA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 854 days.

(21) Appl. No.: 17/452,868

(22) Filed: Oct. 29, 2021

(65) Prior Publication Data

US 2022/0134461 A1 May 5, 2022

Related U.S. Application Data (60) Provisional application No. 63/107,599, filed on Oct. 30, 2020.

(51) Int. Cl.
*B23K 9/067* (2006.01)
*B23K 9/16* (2006.01)

(52) U.S. Cl.
CPC ............ *B23K 9/0675* (2013.01); *B23K 9/164* (2013.01)

(58) Field of Classification Search
CPC ............ B29C 65/1403; B29C 65/1406; B29C 65/1412; B29C 65/1425; B29C 65/1432; B29C 65/1467; B29C 65/7841; B29C 65/7876; B29C 66/00143; B29C 66/0018; B29C 66/02241; B29C 66/0246; B29C 66/028; B29C 66/1142; B29C 66/5221; B29C 66/71; B29C 66/712; B29C 66/7392; B29C 66/73921; B29C 66/7394; B29C 66/73941; B29C 66/83241; B29C 66/857; B29C 69/001
(Continued)

(56) References Cited

U.S. PATENT DOCUMENTS 3,840,750 A    10/1974    Davis et al.
4,521,263 A *   6/1985    Benin ................. A61M 39/146
                                                   604/905

(Continued)

FOREIGN PATENT DOCUMENTS

CN           210518975 U     5/2020
EP            3221121 A1      9/2017
(Continued)

OTHER PUBLICATIONS

International Search Report and Written Opinion for PCT/US2021/072117, mailed Feb. 18, 2022, 13 pages.

*Primary Examiner* — Chris Q Liu
*Assistant Examiner* — James F Sims, III
(74) *Attorney, Agent, or Firm* — Abel Schillinger, LLP; Chi Suk Kim (57) ABSTRACT A irradiation welding apparatus including an irradiation welding generator having at least one irradiation welding head configured to apply an irradiation treatment to end contact surfaces of a first profile and a second profile to join the first profile and the second profile, where the at least one (Continued)

irradiation welding head forms a planar cross-sectional shape in an x-y directional plane relative to the irradiation welding generator.

16 Claims, 8 Drawing Sheets

(58) Field of Classification Search
 USPC ...................................................... 219/130.4
 See application file for complete search history.

(56) References Cited

U.S. PATENT DOCUMENTS

| | | | |
|---|---|---|---|
| 4,610,670 A | 9/1986 | Spencer | |
| 4,793,880 A | 12/1988 | Shaposka et al. | |
| 4,933,036 A | 6/1990 | Shaposka et al. | |
| 5,283,415 A | 2/1994 | Nishi et al. | |
| 6,979,822 B1* | 12/2005 | Stewart | G01N 23/225 |
| | | | 250/397 |
| 9,060,750 B2 | 6/2015 | Lam | |
| 9,550,015 B2 | 1/2017 | Gray | |
| 9,662,745 B2 | 5/2017 | Yao et al. | |
| 10,081,135 B2 | 9/2018 | Patil et al. | |
| 10,195,416 B2 | 2/2019 | Gebauer et al. | |
| 2006/0110282 A1* | 5/2006 | Bilstad | A61M 39/18 |
| | | | 422/28 |
| 2007/0246446 A1 | 10/2007 | Lee et al. | |
| 2008/0009833 A1 | 1/2008 | Corbin et al. | |
| 2011/0100963 A1 | 5/2011 | Mangols et al. | |
| 2011/0220290 A1 | 9/2011 | Hlavinka et al. | |
| 2015/0367569 A1 | 12/2015 | Kusters et al. | |
| 2020/0031045 A1* | 1/2020 | Thompson | B33Y 50/02 |
| 2021/0178506 A1 | 6/2021 | Zhang et al. | |

FOREIGN PATENT DOCUMENTS

| | | |
|---|---|---|
| JP | H08108479 A | 4/1996 |
| KR | 101708024 B1 | 2/2017 |
| WO | 2012125515 A1 | 9/2012 |
| WO | 2016079702 A1 | 5/2016 |
| WO | 2019130223 A1 | 7/2019 |
| WO | 2022094599 A1 | 5/2022 |

* cited by examiner

APPARATUS FOR WELDING

CROSS-REFERENCE TO RELATED APPLICATION(S)

This application claims priority under 35 U.S.C. § 119(e) to U.S. Provisional Application No. 63/107,599, entitled "APPARATUS FOR WELDING," by Jianfeng ZHANG et al., filed Oct. 30, 2020, which is assigned to the current assignee hereof and incorporated herein by reference in its entirety.

FIELD OF THE DISCLOSURE

Welding connections are used to connect various profiles for the delivery and removal of fluids. Such welding connections may be used in a variety of industries, including the medical industry, the food service industry, and the pharmaceutical industry. Thermoplastic and thermoset elastomers are often used in such applications since these elastomers are non-toxic, flexible, thermally stable, have low chemical reactivity, and can be produced in a variety of sizes. In many instances, it is desirable to connect two different connection profiles to create a welded fluid connection. Unfortunately, traditional welding apparatuses cannot effectively join connection profiles having large surface areas efficiently while maintaining a welded fluid connection that may be sterile due to uneven surface treatment. Further, existing apparatuses use rotation of the profiles during treatment or multiple irradiation welding heads to attempt to weld large surface area connection profiles, which are technically complicated or expensive. Therefore, more effective welding apparatuses are desired.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the irradiation welding arts.

Figure 1:
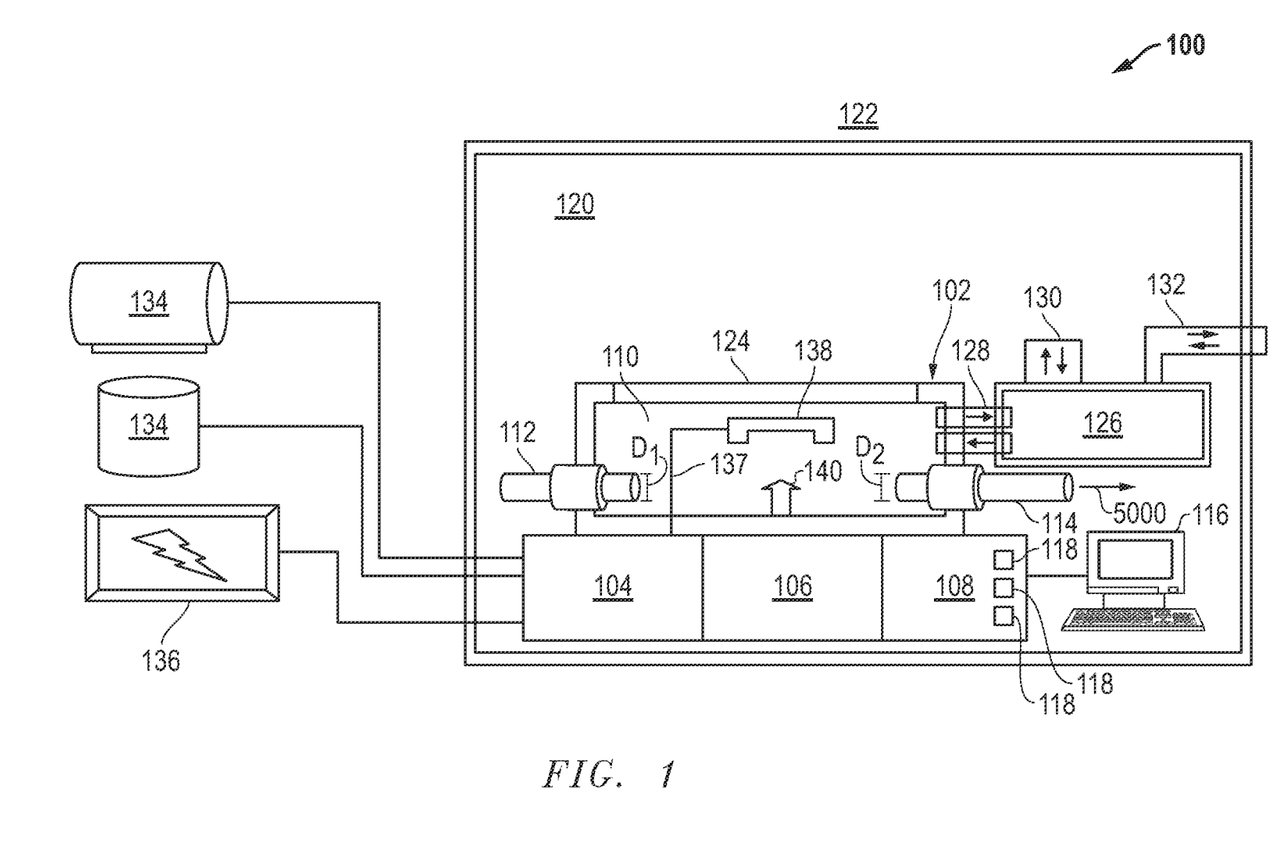
FIG. 1 is a schematic of an irradiation welding apparatus according to an embodiment of the disclosure.

FIG. 1 shows a schematic of an irradiation welding apparatus 100 according to an embodiment of the disclosure. More generally, the irradiation welding apparatus 100 may be configured to join two profiles capable of being joined by welding. Such profiles may include (e.g., tubes, hoses, gaskets (e.g. window gaskets), engineering parts, automotive seating parts, or other shapes or structures. In a number of embodiments, the two profiles may have a lumen through which a fluid may be carried, pumped, or otherwise transported). The irradiation welding apparatus may be done in a sterile environment. The joining of the two profiles may be accomplished by coincidentally welding a first end of a first profile with a second end of a second profile via a surface activation treatment. The surface activation treatment coincidentally and chemically welds the first end of the first profile to the second end of the second profile when they may be placed in direct contact. Any surface activation treatment is envisioned and includes processing input energy to a surface of the first profile, the second profile, or combination thereof. In an embodiment, processing input energy is accomplished by wave irradiation, particular irradiation, or combination thereof. In an embodiment, the wave irradiation includes any wave irradiation envisioned such as radio waves, microwaves, infrared, visible light, ultraviolet, x-rays, gamma radiation, or combination thereof. In a particular embodiment, the wave irradiation includes microwaves, ultraviolet, x-rays, gamma radiation, or combination thereof. In an embodiment, the particle irradiation includes alpha radiation, beta radiation, charged ions, neutron radiation, electron radiation, or combination thereof. In a number of embodiments, the irradiation may be done by plasma irradiation, which may be vacuum plasma. The surface activation treatment provides an effective seal between the two profiles.

The irradiation welding apparatus 100 may generally include an operation chamber 102, an irradiation welding generator 104, a mechanical motion module 106, and a control system 108. The operation chamber 102 may generally include an enclosure that defines a substantially sealed, internal environment 110 where a sterile cutting and/or irradiation welding operation of a first profile 112 and a second profile 114 may occur along a central axis 5000. The irradiation welding generator 104 may generally be configured to generate ionized particles through a irradiation welding treatment (e.g., corona treatment, C-treatment, electron beam treatment, flame treatment, ion treatment, plasma treatment, or combinations thereof) within the operation chamber 102 that may selectively be applied to the first profile 112 and the second profile 114 to activate material on end contact surfaces of the first profile 112 and the second profile 114. The mechanical motion module 106 may generally be configured to axially or otherwise align the first profile 112 and the second profile 114 and/or force contact between the end contact surfaces of the first profile 112 and the second profile 114 to connect, join, or weld the end contact surfaces of the first profile 112 and the second profile 114 together. The control system 108 may generally include a user interface 116 and a plurality of sensors 118, indicators, gauges, or a combination thereof to facilitate control, monitoring, and operation of the irradiation welding process.

The mechanical motion module 106 may generally be configured to axially or otherwise align the first profile 112 and the second profile 114 and/or force contact between the end contact surfaces of the first profile 112 and the second profile 114 to connect, join, or weld the end contact surfaces of the first profile 112 and the second profile 114 together. In some embodiments, the mechanical motion module 106 may be disposed at least partially within the operation chamber 102 or at least partially form a lower barrier or perimeter of the internal environment 110 of the operation chamber 102. In some embodiments, the mechanical motion module 106 may include a cutting system 140. However, in some embodiments, the cutting system 140 may be a standalone component. In some embodiments, the cutting system 140 may be disposed in the internal environment 110 of the operation chamber 102. The cutting system 140 may generally be configured to selectively cut a first tubing component to form the first profile 112 and a second tubing component to form the second profile 114. Accordingly, in some embodiments, the cutting system 140 may include at least one cutting device, such as at least one blade, and the at least one blade may be heated, pre-sterilized, sterilized by the irradiation welding treatment, or a combination thereof. In an embodiment, the cutting device may not be treated at all. The at least one blade may be metal, ceramic, polymer, or any material known or used in the art. However, in some embodiments, the cutting device may include a laser cutting device or system. In a number of embodiments, at least one of the first profile 112 or the second profile 114 may be precut prior to using the irradiation welding apparatus 100. The precut first profile 112 and/or second profile 114 may have a sterile film cover that may be removed prior to use with the irradiation welding apparatus 100.

The irradiation welding apparatus 100 may be configured to connect, join, or weld a wide range of materials. In some embodiments, at least one of the first profile and the second profile may be formed from a polymeric material. However, in some embodiments, both the first profile and the second profile may be formed from a polymeric material. Accordingly, in some embodiments, the first profile and the second profile may be formed from the same polymeric material. In other embodiments, the first profile and the second profile may be formed from different polymeric materials. The irradiation welding apparatus of any of claims 1 to 6, wherein the first profile and the second profile may be formed from a thermoplastic elastomer, a thermoset elastomer, or combination thereof. Further, in some embodiments, the thermoplastic elastomer of the first profile and/or the second profile may include a polystyrene, a polyester, a silicone copolymer, a silicone thermoplastic vulcanizate, a copolyester, a polyamide, a fluoropolymer, a polyolefin, a polyether-ester copolymer, a thermoplastic urethane, a polyether amide block copolymer, a polyamide copolymer, a styrene block copolymer, a polycarbonate, a thermoplastic vulcanizate, an ionomer, a polyoxymethylene (POM), an acrylonitrile butadiene styrene (ABS), an acetal, an acrylic, a polyvinyl chloride (PVC), a blend, or combination thereof. In some embodiments, the thermoset elastomer of the first profile and/or the second profile may include a silicone elastomer, a diene elastomer, a butyl rubber, a natural rubber, a polyurethane rubber, an ethylene propylene diene monomer rubber, an isoprene rubber, a nitrile rubber, a styrene butadiene rubber, a blend, or combination thereof.

In some embodiments, the operation chamber 102 may include an enclosure that defines a substantially sealed, internal environment 110 that may be separated from an external environment, such as a clean room 120 and/or ambient atmosphere 122 outside the clean room 120 and/or a structure, such as a medical facility. In some embodiments, the operation chamber 102 may be configured to at least partially receive the first profile 112 and the second profile 114 to facilitate the sterile cutting and/or irradiation welding operation. However, to maintain a sterile internal environment 110 within the operation chamber 102, the operation chamber 102 may be configured to maintain a fluid tight seal when the first profile 112 and the second profile 114 may be received within the operation chamber 102 and partially protrudes therefrom. As such, in some embodiments, the operation chamber may function to confine an irradiation welding or plasma treatment within the internal environment 110.

In some embodiments, the operation chamber 102 may include at least one transparent surface 124 through which the first profile 112 and the second profile 114 may be visible. In other embodiments, the operation chamber 102 may include multiple transparent surfaces 124 through which the first profile 112 and the second profile 114 may be visible. In yet other embodiments, the operation chamber 102 may be formed from a transparent material (e.g., acrylic, acrylic glass, plexiglass, polycarbonate, or a combination thereof) that allows observation of the first profile 112 and the second profile 114 by an operator from all angles and/or sides of the operation chamber 102. These embodiments may allow an operator to observe the irradiation welding process and/or inspect the final connection between the first profile 112 and the second profile 114 for completion, quality, or a combination thereof. Further, in some embodiments, to protect the safety of an operator and/or integrity of the irradiation welding treatment, the transparent surface(s) may at least partially block ultraviolet light from entering or exiting the enclosure.

As stated, the operation chamber 102 may maintain a substantially sterile, internal environment 110 within the operation chamber 102. In some embodiments, this may be facilitated by a two-way ventilation system 126. In some embodiments, the ventilation system 126 may exchange and/or filter air within the internal environment 110 via a first exchange system 128. In some embodiments, the ventilation system 126 may exchange and/or filter air between the clean room 120 and the internal environment 110 via a second exchange system 130. Further, in some embodiments, the ventilation system 126 may exchange and/or filter air between the ambient atmosphere 122 and the internal environment 110 via a third exchange system 132. As such, the ventilation system 126 may include a filter, a catalytic converter, a radiative element, or a combination thereof that treats (e.g., filters, sterilizes, reduces ozone, temperature conditions, or combinations thereof) air received from the clean room 120 via the second exchange system 130 and that enters or exits the internal environment 110 of the operation chamber 102 through the first exchange system 128. Additionally, the ventilation system 126 may also include a filter, a catalytic converter, a radiative element, or a combination thereof that treats air received from ambient atmosphere 122 via the third exchange system 132 and that enters or exits the internal environment 110 of the operation chamber 102 through the first exchange system 128.

The irradiation welding generator 104 may generally include a gas supply 134, a power supply 136, and at least one irradiation welding head 138 and be configured to generate ionized particles through a irradiation welding treatment (e.g., corona treatment, C-treatment, flame treatment, ion treatment, plasma treatment, electron beam treatment, or combinations thereof) within the operation chamber 102 that may selectively be applied to the first profile 112 and the second profile 114 to activate material on end contact surfaces of the first profile 112 and the second profile 114. The gas supply 134 may be configured to provide a flow of one or more gasses, such as an inert gas, an oxygen containing gas, a nitrogen containing gas, a fluorine containing gas, or a combination thereof. In some embodiments, the gas supply 134 may include an atmospheric air supply, a compressor, a compressed gas cylinder, an in-house gas line, an in-house compressed gas line, a fan, a turbo, or any combination thereof to produce the flow of gas. In some embodiments, the inert gas may include argon, neon, helium, or any combination thereof. In other embodiments, the oxygen containing gas may include atmospheric air, pure oxygen, alcohol, water vapor, carbon dioxide, carbon monoxide, or a combination thereof. In yet other embodiments, the nitrogen containing gas may include atmospheric air, pure nitrogen, ammonia, or a combination thereof. Still, in other embodiments, the fluorine containing gas may include sulfur hexafluoride (SF6), trifluoromethane (CHF3), tetrafluoromethane (CF4), octafluorocyclobutane (C4F8), or a combination thereof. The gas supply 134 may flow into the airtight or vacuum operation chamber 102 that is controlled for pressure and localized to ionize particles or waves to form irradiation welds via the control system 108.

The power supply 136 may generally be configured to ionize the flow of gas by imparting an electrical charge to the flow of gas to generate the irradiation welding treatment. In some embodiments, the power supply 136 may be configured to provide an alternating current voltage of at least 110 VAC, at least 120 VAC, at least 220 VAC, or at least 240 VAC. However, in other embodiments, the power supply 136 may be configured to provide a direct current voltage of at least 6 VDC, at least 9 VDC, at least 12 VDC, at least 24 VDC, or at least 48 VDC. The current being applied to the welding head 138 can be AC or DC.

The irradiation welding treatment may be delivered to the at least one irradiation welding head 138 disposed within the internal environment 110 of the operation chamber 102 through at least one supply line 137. The irradiation welding head 138 may be disposed within the internal environment 110 of the operation chamber 102 and located within the operation chamber, such that the at least one irradiation welding head 138 applies the irradiation welding treatment to the end contact surfaces of the first profile 112 and the second profile 114. Accordingly, applying the irradiation welding applying the irradiation welding treatment to the end contact surfaces of the first profile 112 and the second profile 114 may include exposing or subjecting the end contact surfaces of the first profile 112 and the second profile 114 to the irradiation welding treatment or delivering or directing the irradiation welding treatment to contact or substantially envelope the end contact surfaces of the first profile 112 and the second profile 114. By applying the irradiation welding treatment to the end contact surfaces, material at the end contact surfaces may be activated for welding the first profile 112 to the second profile 114 when they may be forced into contact.

In some embodiments, the irradiation welding generator 104 may include a single irradiation welding head 138 disposed within the internal environment 110 of the operation chamber 102. However, in some embodiments, the irradiation welding generator 104 may include a plurality of irradiation welding heads 138 disposed within the internal environment 110 of the operation chamber 102. In a particular embodiment, at least one of the plurality of irradiation welding heads 138 may be disposed adjacently to the first profile 112 within the operation chamber 102, and at least one of the plurality of irradiation welding heads 138 may be disposed adjacently to the second profile 114 within the internal environment 110 of the operation chamber 102. Furthermore, in another particular embodiment, at least one of the plurality of irradiation welding heads 138 may be configured to sterilize the internal environment 110 within the operation chamber 102.

Figure 2A:
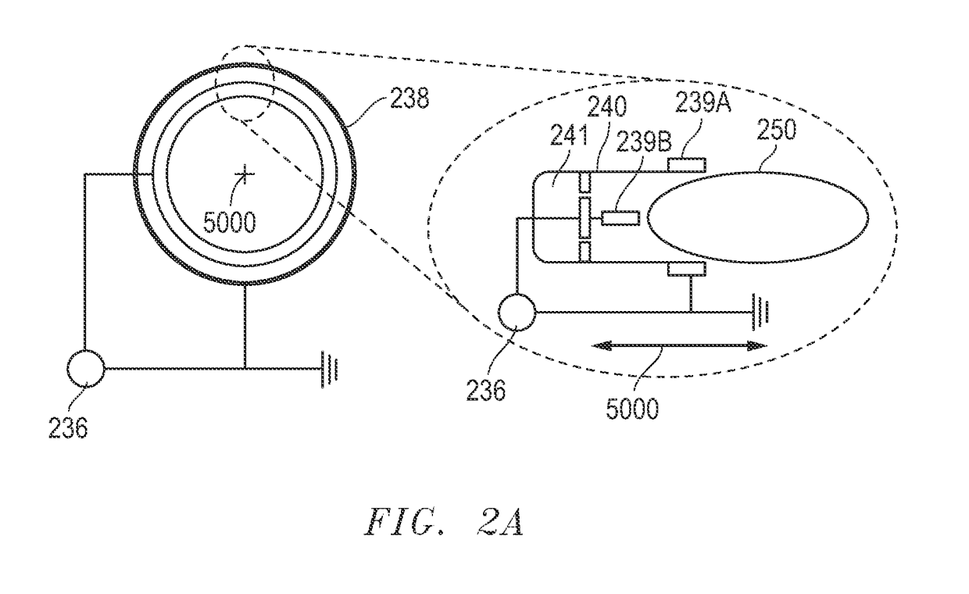
FIG. 2A is a schematic diagram of a partial cross-section of an irradiation welding head in an axial direction relative to a central axis according to a number of embodiments of the disclosure.
Figure 2B:
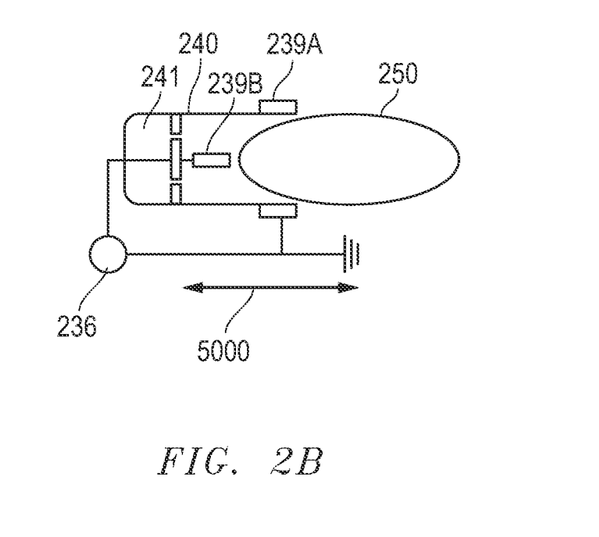
FIG. 2B is a schematic diagram of cross-section of an irradiation welding head in an axial direction relative to a central axis according to a number of embodiments of the disclosure.
Figure 2C:
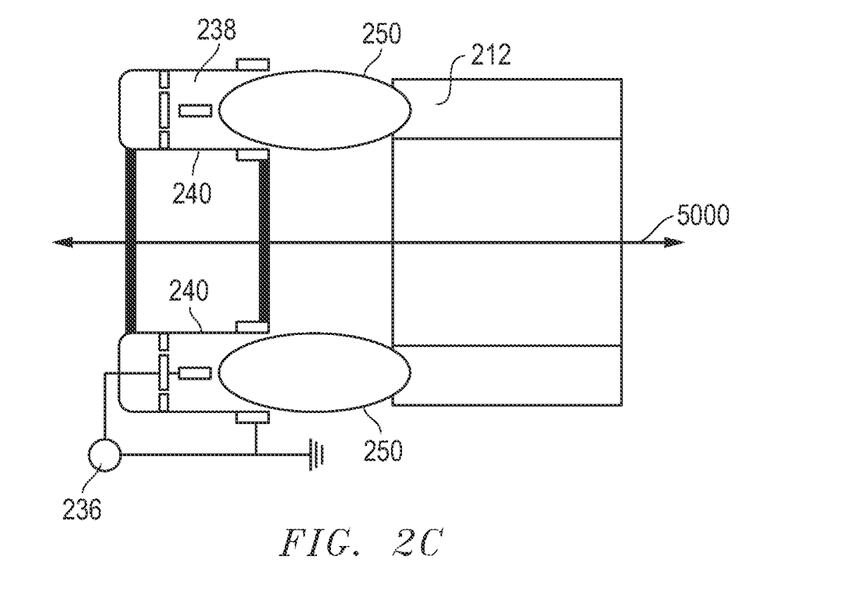
FIG. 2C is a schematic diagram of a cross-section of an irradiation welding head down a central axis in an x-y plane according to a number of embodiments of the disclosure.
Figure 2D:
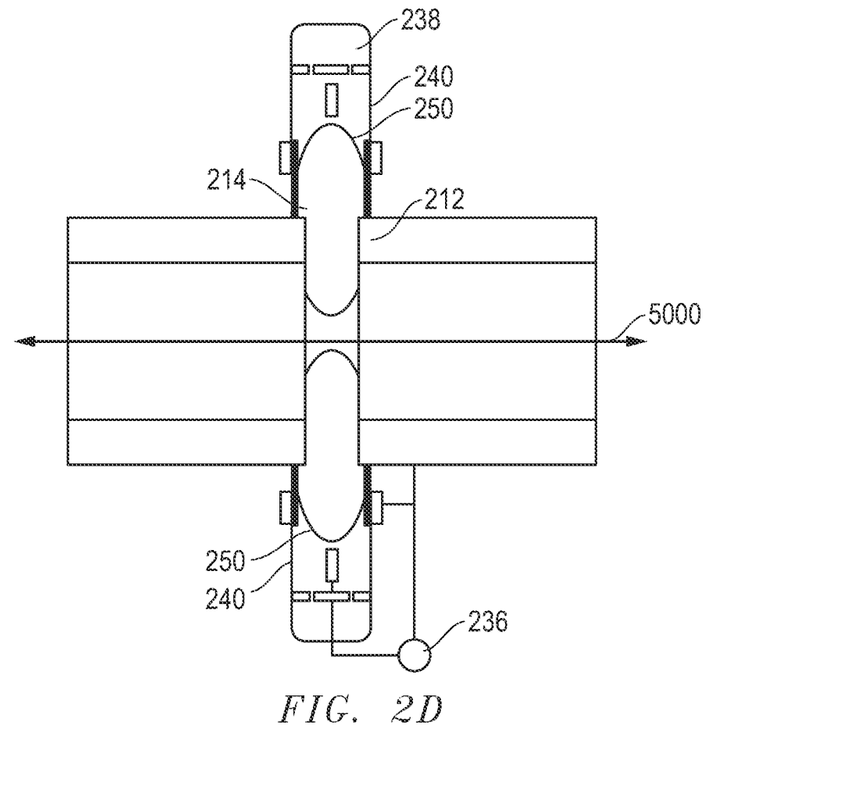
FIG. 2D shows a schematic diagram of cross-section of an irradiation welding head in an axial direction relative to a central axis according to a number of embodiments of the disclosure.

FIG. 2A shows a schematic diagram of a partial cross-section of a irradiation welding head 238 in an axial direction relative to a central axis 5000 according to a number of embodiments of the disclosure. FIG. 2B shows a schematic diagram of cross-section of a irradiation welding head 238 in an axial direction relative to a central axis 5000 according to a number of embodiments of the disclosure. FIG. 2C shows a schematic diagram of a cross-section of a irradiation welding head 238 down a central axis 5000 in an x-y plane according to a number of embodiments of the disclosure. FIG. 2D shows a schematic diagram of cross-section of an irradiation welding head 238 in an axial direction relative to a central axis 5000 according to a number of embodiments of the disclosure. As shown in FIGS. 2C-2D, the irradiation welding head 238 may be configured to apply an irradiation welding treatment 250 to the end contact surfaces of the first profile and the second profile as stated above. The irradiation welding head 238 may have an irradiation welding head housing 240. The housing 240 may be made of any known material including a dielectric (such as a ceramic) or a conductive material (such as aluminum, copper, silver, aluminum graphite, platinum, brass, or may be another metal). The irradiation welding head 238 may include a power supply 236 as stated above. The power supply 236 may be connected to a plurality of electrodes 239. The electrodes 239 may be formed of a material commonly used in electrodes. In specific embodiments, the electrodes 239 may be formed of aluminum, copper, silver, aluminum graphite, platinum, brass, titanium, or may be another metal. In a number of embodiments, the power supply 236 may be connected to a plurality of electrodes including a first electrode 239A, and a second electrode 239B. In a number of embodiments, the irradiation welding head 238 may include a gas supply as stated above. The gas supply may direct a gas through a gas flow channel 241 that combines with the electrodes 239 to form an irradiation to weld or otherwise combine the first profile and the second profile. In a number of embodiments, as shown in FIG. 2B the irradiation welding head 238 may directly face parallel to the cross-section end contact surfaces of at least one of the first profile 212 and/or the second profile 214 down the central axis 5000. In other words, the irradiation welding head 238 may directly face the end contact surfaces of at least one of the first profile 212 and/or the second profile 214 down the central axis 5000 in the x direction relative to the irradiation welding generator. In a number of embodiments, as shown in FIG. 2D the irradiation welding head 238 may directly face perpendicular to at least one of the cross-section of the first profile 212 and/or the second profile 214 down the central axis 5000. The irradiation welding head 238 may apply irradiation welding treatment 250 to at least one of a planar area of an end contact surface of a first profile and a planar area of an end contact surface of a second profile. In other words, the irradiation welding head 238 may directly face the end contact surfaces of at least one of the first profile 212 and/or the second profile 214 down the central axis 5000 in the y direction relative to the irradiation welding generator. The irradiation welding head 238 may form a planar cross-sectional shape in an x-y directional plane relative to the irradiation welding generator along central axis 5000. The planar cross-sectional shape may be circular, polygonal, oval, or another shape. As shown in FIG. 2C, the planar cross-sectional shape may be circular.

Figure 3A:
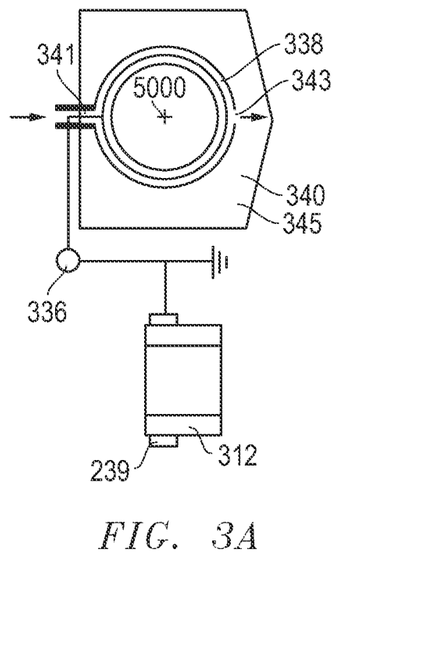
FIG. 3A is a schematic diagram of cross-section of an irradiation welding head in an axial direction relative to a central axis according to a number of embodiments of the disclosure.
Figure 3B:
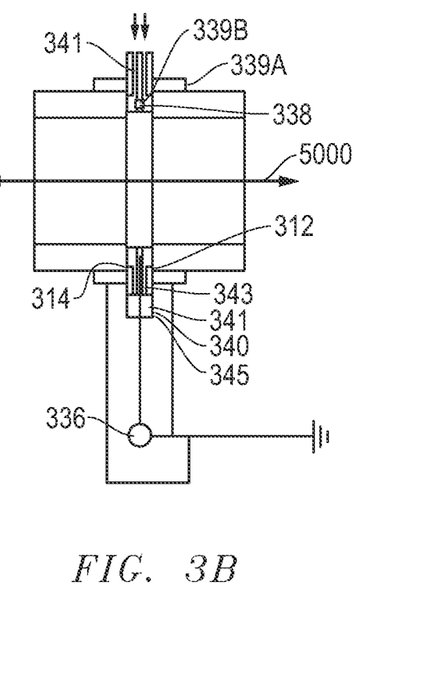
FIG. 3B is a schematic diagram of a cross-section of an irradiation welding head down a central axis in an x-y plane according to a number of embodiments of the disclosure.

FIG. 3A shows a schematic diagram of cross-section of a irradiation welding head 338 in an axial direction relative to a central axis 5000 according to a number of embodiments of the disclosure. FIG. 3B shows a schematic diagram of a cross-section of a irradiation welding head 338 down a central axis 5000 in an x-y plane according to a number of embodiments of the disclosure. As shown in FIG. 3A, the irradiation welding head 338 may be configured to apply a irradiation welding treatment 350 to the end contact surfaces of the first profile and/or the second profile as stated above. The irradiation welding head 338 may have an irradiation welding head housing 340. The housing 340 may be made of any known material including a dielectric (such as a ceramic) or a conductive material (such as aluminum, copper, silver, aluminum graphite, platinum, brass, or may be another metal). The irradiation welding head 338 may include a power supply 336 as stated above. The power supply 336 may be connected to a plurality of electrodes 339. In a number of embodiments, the power supply 336 may be connected to a plurality of electrodes including a first electrode 339A, and a second electrode 339B. In a number of embodiments, the irradiation welding head 33 may include a gas supply as stated above. As shown in FIG. 3B, the gas supply may direct a gas jet through a gas flow channel 341 that combines with the electrodes 339 to form a irradiation to weld or otherwise combine the first profile and the second profile. In a number of embodiments, the irradiation welding head 338 may further include a vent 343 to expel excess gas not used in the welding process. In a number of embodiments, as shown in FIG. 3A the irradiation welding head 338 may directly face parallel to the cross-section of at least one of the first profile 312 and/or the second profile 314 down the central axis 5000. The irradiation welding head 338 may apply irradiation welding treatment 350 to at least one of a planar area of an end contact surface of a first profile and a planar area of an end contact surface of a second profile. The irradiation welding head 338 may form a planar cross-sectional shape in an x-y directional plane relative to the irradiation welding generator along central axis 5000. The planar cross-sectional shape may be circular, polygonal, oval, or another shape. As shown in FIG. 3B, the planar cross-sectional shape may be circular. As stated above, the irradiation welding apparatus may include a cutting system including least one cutting device 345, such as at least one blade. As shown in FIGS. 3A and 3B, the cutting device 345 may be in the form of a blade. In a number of embodiments, the cutting device 345 may be operatively connected to the irradiation welding head 338 in a number of embodiments. The cutting device 345 may incorporate the irradiation welding head 338 within the blade in a number of embodiments. In this manner, the first and second profiles may be separated and/or welded using a single component. In a number of embodiments, the cutting device 345 may cut a component to form the first profile 212 and the second profile 214 from each other. The cutting device 345 may be moved in an adjustable distance to provide the irradiation welding head 338 enough distance to provide the right exposure dosage and/or power to activate the respective surfaces of the first profile 212 or the second profile 214. Further, as shown in FIGS. 3A and 3B, the gas may enter through an edge of the cutting device 345 of the irradiation welding head 338 and vent out a different edge of the cutting device 345 of the irradiation welding head 338. As shown in FIG. 3B, the vent 343 may be slotted within the cutting device 345 of the irradiation welding head 338.

Figure 4:
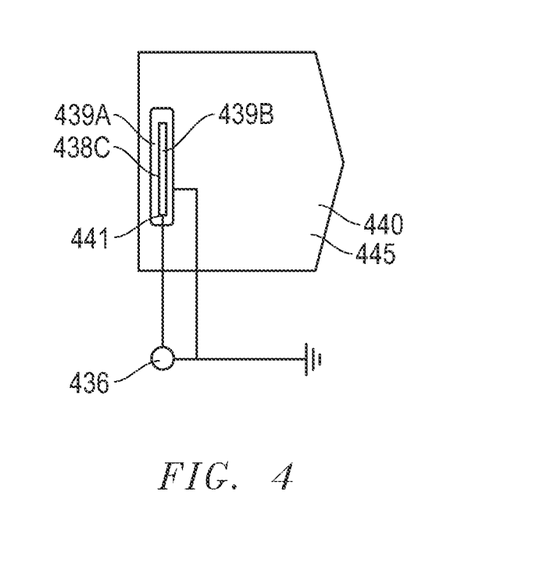
FIG. 4 is a schematic diagram of a cross-section of an irradiation welding head down a central axis in an x-y plane according to a number of embodiments of the disclosure.

FIG. 4 shows a schematic diagram of a cross-section of an irradiation welding head 438 down a central axis 5000 in an x-y plane according to a number of embodiments of the disclosure. The irradiation welding head 438 may be configured to apply an irradiation welding treatment 450 to the end contact surfaces of the first profile and the second profile as stated above. As shown in FIG. 4, the irradiation welding head 438 may include any of the components of the irradiation welding heads described in embodiments herein. The irradiation welding head 438 may include a power supply 436 as stated above. The irradiation welding head 438 may have an irradiation welding head housing 440. The housing 440 may be made of any known material including a dielectric (such as a ceramic) or a conductive material (such as aluminum, copper, silver, aluminum graphite, platinum, brass, or may be another metal). The power supply 436 may be connected to a plurality of electrodes 439. In a number of embodiments, the power supply 436 may be connected to a plurality of electrodes including a first electrode 439A, and a second electrode 439B. In a number of embodiments, the irradiation welding head 438 may include a gas supply as stated above. As shown in FIG. 4, the gas supply may direct an irradiation welding jet through the electrodes 439 to weld or otherwise combine the first profile and the second profile. The irradiation welding head 438 may apply irradiation welding treatment 450 to at least one of a planar area of an end contact surface of a first profile and a planar area of an end contact surface of a second profile. The irradiation welding head 438 may form a planar cross-sectional shape in an x-y directional plane relative to the irradiation welding generator along central axis 5000. The planar cross-sectional shape may be circular, polygonal, oval, or another shape. As shown in FIG. 4, the planar cross-sectional shape may be rectangular. As stated above, the irradiation welding apparatus may include a cutting system including least one cutting device 445, such as at least one blade. As shown in FIG. 4, the cutting device 445 may be in the form of a blade. The cutting device 445 may incorporate the irradiation welding head 438 in a number of embodiments. In this manner, the first and second profiles may be separated and/or welded using a single component. In a number of embodiments, the cutting device 445 may cut a component to form the first profile 212 and the second profile 214 from each other. The cutting device 445 may be moved in an adjustable distance to provide the irradiation welding head 438 enough distance to provide the right exposure dosage and/or power to activate the surface of the first profile 212 or the second profile 214 to activate their respective surfaces.

Figure 5A:
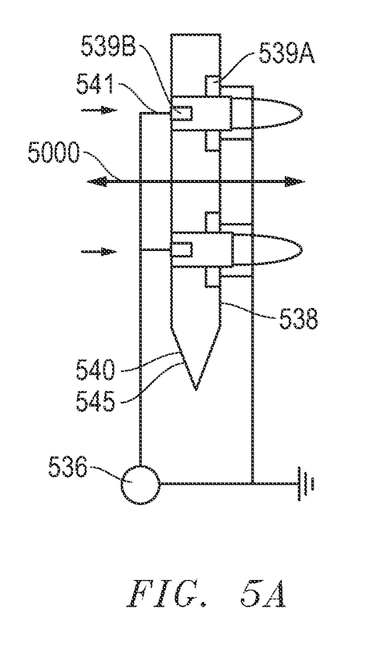
FIG. 5A is a schematic diagram of cross-section of an irradiation welding head in an axial direction relative to a central axis according to a number of embodiments of the disclosure.
Figure 5B:
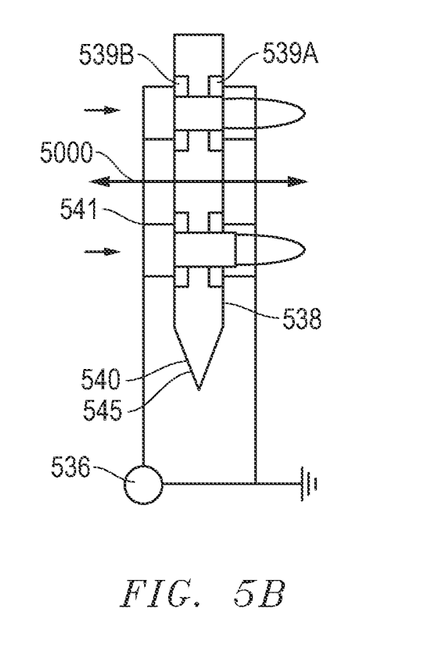
FIG. 5B is a schematic diagram of cross-section of an irradiation welding head in an axial direction relative to a central axis according to a number of embodiments of the disclosure.
Figure 5C:
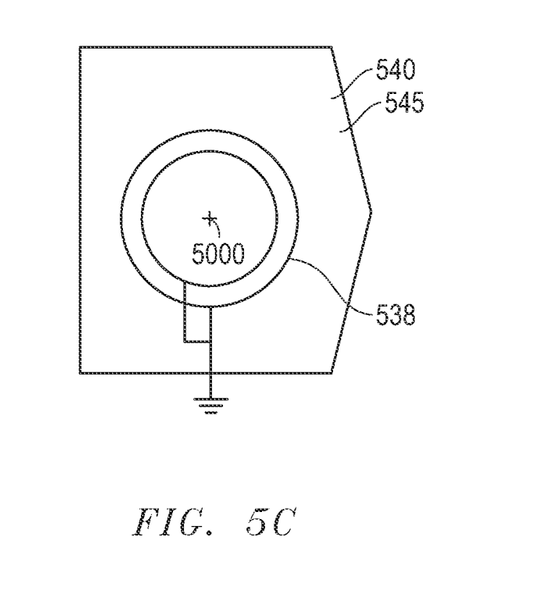
FIG. 5C is a schematic diagram of a cross-section of an irradiation welding head down a central axis in an x-y plane according to a number of embodiments of the disclosure.

FIG. 5A shows a schematic diagram of cross-section of a irradiation welding head 538 in an axial direction relative to a central axis 5000 according to a number of embodiments of the disclosure. FIG. 5B shows a schematic diagram of cross-section of a irradiation welding head 538 in an axial direction relative to a central axis 5000 according to a number of embodiments of the disclosure. FIG. 5C shows a schematic diagram of a cross-section of a irradiation welding head 538 down a central axis 5000 in an x-y plane according to a number of embodiments of the disclosure. As shown in FIG. 5A, the irradiation welding head 538 may be configured to apply a irradiation welding treatment 550 to the end contact surfaces of the first profile and the second profile as stated above. The irradiation welding head 538 may have an irradiation welding head housing 540. The housing 540 may be made of any known material including a dielectric (such as a ceramic) or a conductive material (such as aluminum, copper, silver, aluminum graphite, platinum, brass, or may be another metal). The irradiation welding head 538 may include a power supply 536 as stated above. The power supply 536 may be connected to a plurality of electrodes 539. In a number of embodiments, the power supply 536 may be connected to a plurality of electrodes including a first electrode 539A, and a second electrode 539B. The first electrode 539A and the second electrode 539B may be on located within the irradiation welding head 538. As shown in FIG. 5A, the first electrode 539A and the second electrode 539B may be on located down a face within the irradiation welding head 538. As shown in FIG. 5B, at least one of the first electrode 539A or the second electrode 539B may be on located down the thickness of the irradiation welding head 538. In a number of embodiments, the irradiation welding head 538 may include a gas supply as stated above. As shown in FIG. 5B, the gas supply may direct a irradiation welding jet through a gas flow channel 541 that combines with the electrodes 539 to weld or otherwise combine the first profile and the second profile. In a number of embodiments, as shown in FIG. 5A the irradiation welding head 538 may directly face parallel to the cross-section of at least one of the first profile 212 and/or the second profile 214 down the central axis 5000. The irradiation welding head 538 may apply irradiation welding treatment 550 to at least one of a planar area of an end contact surface of a first profile and a planar area of an end contact surface of a second profile. The irradiation welding head 538 may form a planar cross-sectional shape in an x-y directional plane relative to the irradiation welding generator along central axis 5000. The planar cross-sectional shape may be circular, polygonal, oval, or another shape. As shown in FIG. 5B, the planar cross-sectional shape may be circular. As stated above, the irradiation welding apparatus may include a cutting system including least one cutting device 545, such as at least one blade. As shown in FIGS. 5A and 5B, the cutting device 545 may be in the form of a blade. The cutting device 545 may incorporate the irradiation welding head 538 in a number of embodiments. In this manner, the first and second profiles may be separated and/or welded using a single component. In a number of embodiments, the cutting device 545 may cut a component to form the first profile 212 and the second profile 214 from each other. The cutting device 545 may be moved in an adjustable distance to provide the irradiation welding head 538 enough distance to provide the right exposure dosage and/or power to activate the surface of the first profile 212 or the second profile 214 to activate their respective surfaces.

The irradiation welding apparatus 100 may be configured to form a sterile, irradiation welded connection 142 between the first profile 112 and the second profile 114. In a number of embodiments, the first profile 112 may have a particular smallest dimension $D_1$. The smallest dimension may be defined as the smallest value of distance (e.g. length, width, or height) of a surface area of the first profile 112. According to certain embodiment, the dimension $D_1$ of the first profile 112 may be at least about 1 mm, such as, at least about 10 mm or at least about 20 mm or at least about 30 mm or at least about 40 mm or even at least about 50 mm.

The irradiation welding apparatus 100 may be configured to form a sterile, welded connection 142 between the first profile 112 and the second profile 114. In a number of embodiments, the second profile 114 may have a particular smallest dimension $D_2$. The smallest dimension may be defined as the smallest value of distance (e.g. length, width, or height) of a surface area of the second profile 114. According to certain embodiment, the dimension $D_2$ of the second profile 114 may be at least about 1 mm, such as, at least about 10 mm or at least about 20 mm or at least about 30 mm or at least about 40 mm or even at least about 50 mm.

Figure 6:
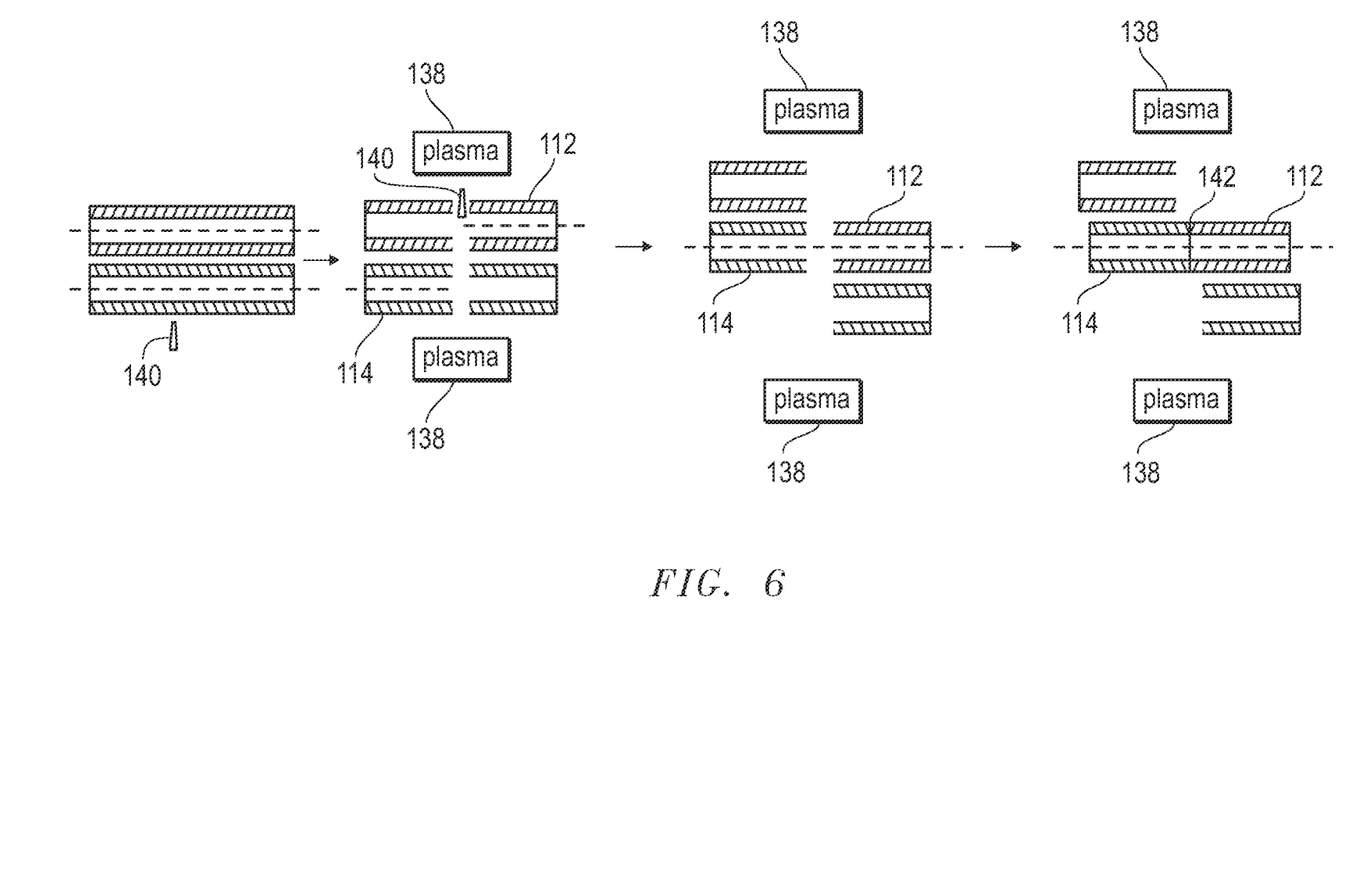
FIG. 6 is a schematic diagram of a mechanical motion module according to an embodiment of the disclosure.

FIG. 6 shows a schematic diagram of a mechanical motion module 106 according to an embodiment of the disclosure. In the embodiment shown, the mechanical motion module 106 may include a linear motion module. To prepare the first profile 112 and the second profile 114 for irradiation welding, the cutting system 140 may be selectively operated to cut two components to form the first profile 112 and the second profile 114. In some embodiments, the irradiation welding treatment may be applied before, during, and/or after the cutting process to activate material on the end contact surfaces of the first profile 112 and the second profile 114, as described above. The mechanical motion module 106 may be configured to axially align the end contact surfaces of the first profile 112 and the second profile 114. In some embodiments, the mechanical motion module 106 may linearly displace (substantially perpendicular to axial) at least one of the first profile 112 and the second profile 114 to axially align the end contact surfaces of the first profile 112 and the second profile 114. In other embodiments, the mechanical motion module 106 may linearly displace both the first profile 112 and the second profile 114 to axially align the end contact surfaces of the first profile 112 and the second profile 114. Additionally, once axially aligned, the mechanical motion module 106 may also be configured to force the end contact surfaces, which may be activated by the irradiation welding treatment, of the first profile 112 and the second profile 114 into contact to weld the first profile 112 and the second profile 114 at their end contact surfaces, thereby forming a joint or welded connection 142, as described above. In some embodiments, the irradiation welding treatment may continue after the first profile 112 and the second profile 114 may be joined to ensure a sterile connection, thereby forming a joint or welded connection 142.

Figure 7:
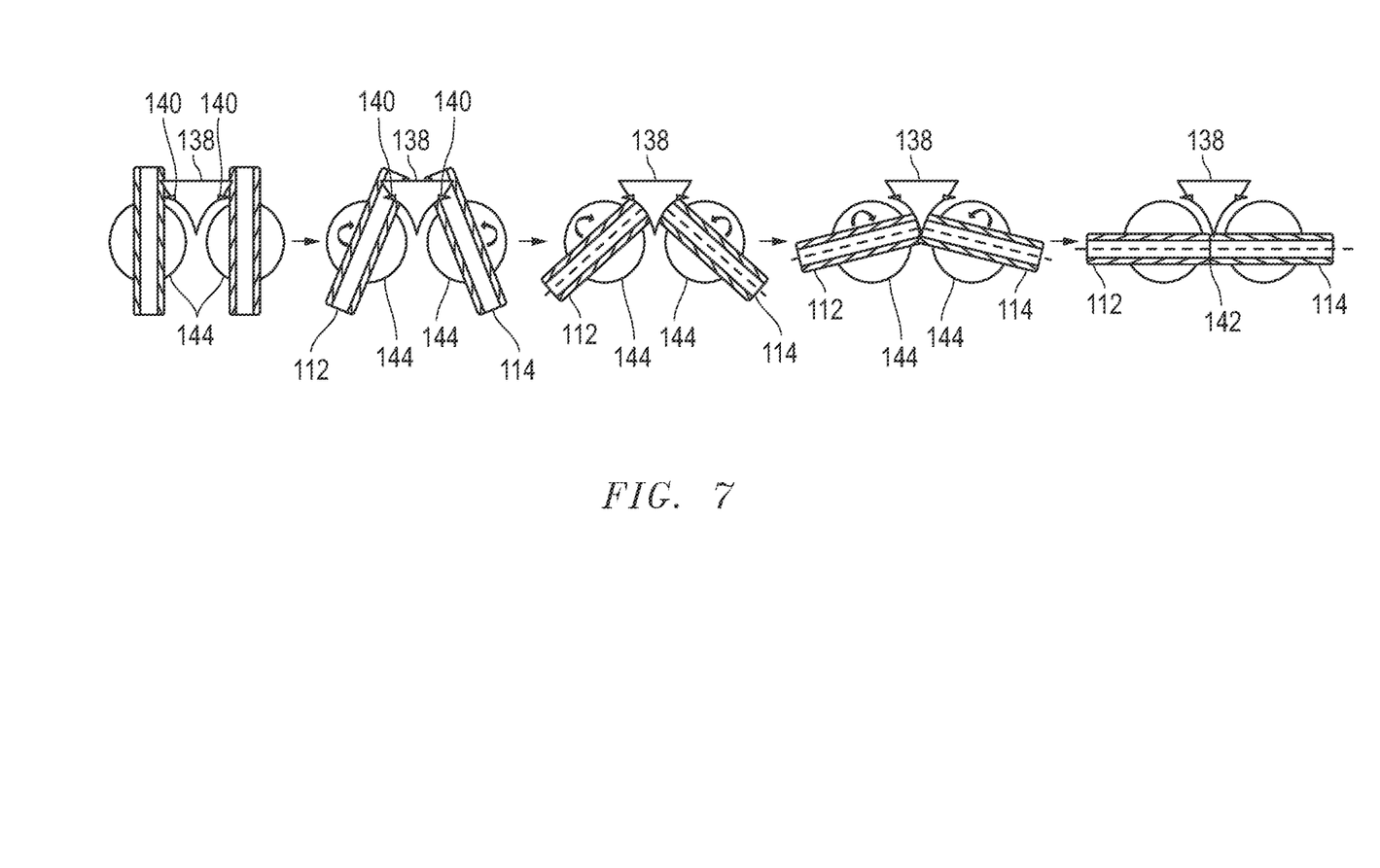
FIG. 7 is a schematic diagram of a mechanical motion module according to an embodiment of the disclosure.

FIG. 7 shows a schematic diagram of a mechanical motion module 106 according to another embodiment of the disclosure. In the embodiment shown, the mechanical motion module 106 may include a rotary motion module. To prepare the first profile 112 and the second profile 114 for irradiation welding, two components captured by rotary motion devices 144 may be selectively rotated to bring the two components into contact with respective cutting devices to form the first profile 112 and the second profile 114. In some embodiments, the irradiation welding treatment may be applied before, during, and/or after the cutting process to activate material on the end contact surfaces of the first profile 112 and the second profile 114, as described above. The rotary motion devices 144 of the mechanical motion module 106 may be configured to continually rotate the first profile and the second profile to axially align the end contact surfaces of the first profile 112 and the second profile 114 to axially align the end contact surfaces of the first profile 112 and the second profile 114. In other embodiments, the mechanical motion module 106 may linearly displace both the first profile 112 and the second profile 114 to axially align the end contact surfaces of the first profile 112 and the second profile 114. Additionally, once axially aligned, the rotary motion devices 144 of the mechanical motion module 106 may also be configured to force the end contact surfaces, which may be activated by the irradiation welding treatment, of the first profile 112 and the second profile 114 into contact to weld the first profile 112 and the second profile 114 at their end contact surfaces, thereby forming a joint or welded connection 142, as described above. In some embodiments, the irradiation welding treatment may continue after the first profile 112 and the second profile 114 may be joined to ensure a sterile joint or welded connection 142.

In some embodiments, the mechanical motion module 106 may be configured to manipulate one or more lumens of the first profile 112 and the second profile 114 prior to irradiation welding. As such in some embodiments, the first profile 112 and the second profile 114 may remain open during the irradiation welding treatment and/or joining the first profile 112 and the second profile 114.

As stated, the irradiation welding treatment may be applied before, during, and/or after the cutting process and/or the joining process to activate material on the end contact surfaces of the first profile 112 and the second profile 114. In some embodiments, the irradiation welding treatment may be applied before cutting the first profile 112 and the second profile to ensure a sterile connection. In some embodiments, the irradiation welding treatment may begin at least 1 second before cutting the first profile 112 and the second profile 114, such as, at least 2 seconds before cutting the first profile 112 and the second profile 114 or at least 3 seconds, or at least 5 seconds, or at least 10 seconds, or at least 15 seconds, or at least 30 seconds, or at least 45 seconds, or at least 60 seconds, or at least 90 seconds, or at least 120 seconds before cutting the first profile 112 and the second profile 114. In some embodiments, the irradiation welding treatment may continue after the first profile and the second profile may be joined to ensure a sterile connection. In some embodiments, the irradiation welding treatment may continue for at least 1 second, or at least 2 seconds, or at least 3 seconds, or at least 5 seconds, or at least 10 seconds, or at least 15 seconds, or at least 30 seconds, or at least 45 seconds, or at least 60 seconds, or at least 90 seconds, or at least 120 seconds after joining the first profile 112 and the second profile 114.

Referring again to FIG. 1, ensuring a sterile connection between the first profile 112 and the second profile 114 may be the result of pretreating the internal environment 110 of the operation chamber 104 with the irradiation welding treatment or beginning the irradiation welding treatment before the cutting operation of the first profile 112 and the second profile 114. Further, ensuring the sterile connection between the first profile 112 and the second profile 114 may also be the result of continuing to apply the irradiation welding treatment after the first profile 112 and the second profile 114 may be joined via irradiation welding. Accordingly, the irradiation welding treatment provides an interior environment 110 of the operation chamber 102 with a sterile environment, wherein the sterile environment is defined by a reduction in the amount of living microorganisms within the interior environment 110 of the operation chamber by a level of at least $10^6$ after an exposure to the irradiation welding treatment or irradiation welding for at least 10 seconds, at least 15 seconds, at least 20 seconds, at least 25 seconds, at least 30 seconds or at least 60 seconds. The operation chamber can be air tight.

Furthermore, it will be appreciated that the irradiation welding process may be performed at various temperatures within the internal environment 110 of the operation chamber 102. For example, in some embodiments, the irradiation welding process may be performed at room temperature, such as that within the clean room 120. However, it will be appreciated that the irradiation welding process may be performed and configured to provide a sterile connection between the first profile 112 and the second profile 114 at any temperature between about 10 degrees Celsius to 350 degrees Celsius.

The control system 108 may generally include a user interface 116 and a plurality of sensors 118, indicators, gauges, or a combination thereof to facilitate control, monitoring, and operation of the irradiation welding generator 104, the mechanical motion module 106, and the irradiation welding process. The user interface 116 may generally include a display configured to display a temperature, a gas flow rate, a gas pressure, a gas detection level, a material of the first profile and the second profile, an irradiation welding treatment progress level, a working cycle, a total number of working cycles, or a combination thereof. In a particular embodiment, the user interface 116 may include a material selection input for selecting properties a material of each of the first profile 112 and the second profile 114. Furthermore, in some embodiments, the user interface 116 may include a warning system configured to alert an operator when an out of conformance condition exists. The user interface 116 may also be configured to automatically stop the irradiation welding treatment when an out of conformance condition exists. Example out of conformance conditions include, but are not limited to a low temperature, a high temperature, a low pressure, a high pressure, a low gas flow rate, a high gas flow rate, a detection of a irradiation welding byproduct, an invalid selection of a material, a leak in the operation chamber, or a combination thereof. When such conditions occur, the control system 108 may prevent opening and/or removal of the operation chamber 102. Further, the control system 108 may also prevent opening and/or removal of the operation chamber 102 during application of the irradiation welding treatment.

The plurality of sensors 118, indicators, gauges, or combinations thereof may generally be configured to convey data (e.g., operational parameters) regarding the irradiation welding operation to an operator and allow an operator to oversee the irradiation welding process. In some embodiments, the plurality of sensors 118 may include a temperature sensor, a gas flow rate sensor, a gas pressure sensor, a gas detection sensor, an irradiation welding byproduct sensor, a tension sensor, or a combination thereof. Further, in some embodiments, the control system 108 may be configured to log or store data transmitted from the sensors 118 related to operation of the irradiation welding apparatus 100. This data may be used in troubleshooting and/or adjusting operational parameters of the components 102, 104, 106, 108 of the irradiation welding apparatus 100 or the irradiation welding process.

Furthermore, in some embodiments, the control system 108 may include at least one vision system (e.g., camera, inspection, video, sensor), and/or a corresponding signal source (e.g., polarized light, near-IR, UV, or visible light, X-ray, or may be another type) configured to verify axial alignment of the end contact surfaces of the first profile 112 and the second profile 114, confirm successful joining of the first profile 112 to the second profile 114, or a combination thereof. In some embodiments, the control system 108 may also include a marking system configured to mark the first profile 112, the second profile 114, a joint or welded connection 142 formed between the first profile 112 and the second profile 114, or a combination thereof via laser marking, ink marking, or any combination thereof that allows identification, verification, troubleshooting or any combination thereof of one or more characteristics of the joint or welded connection 142 formed between the first profile 112 and the second profile 114.

The irradiation welding apparatus 100 may be configured to form a sterile welded connection 142 between the first profile 112 and the second profile 114. The resulting welded connection 142 may retain specific performance characteristics commensurate with an unmodified control bulk material of the first profile 112 or the second profile 114. Accordingly, in some embodiments, after the joint or welded connection 142 between the first profile 112 and the second profile 114 is formed, the control system 108 may be configured to conduct a burst test, a tension test, or a combination thereof between the first profile 112 and the second profile 114 to ensure a successful welded connection 142 between the first profile 112 and the second profile 114. In some embodiments, a joint or welded connection 142 formed between the first profile 112 and the second profile 114 may include a tensile strength of at least 10%, at least 15%, at least 25%, at least 30%, at least 35%, at least 40%, at least 45%, or at least 50% of the tensile strength of an unmodified control bulk material of the first profile 112 or the second profile 114. Furthermore, in some embodiments, a joint or welded connection 142 formed between the first profile 112 and the second profile 114 may include a burst pressure of at least 10%, at least 25%, at least 50%, at least 60%, at least 65%, at least 70%, at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, or at least 90% of the of the burst pressure of an unmodified control bulk material of the first profile or the second profile.

Still further, in some embodiments, a reinforcement may be at least partially applied about the welded connection 142 formed between the first profile 112 and the second profile 114. The reinforcement may include an adhesive tape, a polymer tape, an overmolded polymer, a welded polymer or polymer tape, a mechanical clamp, or a combination thereof. Mechanical clamps may include screw threads or threadings, screws, bolts, clamps, clasps, clips, latches, pins, rivets, ties, nails, battens, buckle, flange, frog, grommet, hook-and-eye, peg, screw anchor, snap fastener, stitch, threaded fastener, tie, toggle bolt, wedge anchor, pin, groove and stop, nut and bolt, nut and screw, latch, handle, locking nut, tie rivet, or may be a different component.

The irradiation welding apparatus 100 may generally be configured such that the operation chamber 102 and the mechanical motion module 106 may be configured for mobile use and remotely coupled to the irradiation welding generator 104 and/or the control system 108. Additionally, in some embodiments, the irradiation welding apparatus 100 may be a unitary apparatus mounted to a cart or other apparatus for mobile utility, in which the entire irradiation welding apparatus 100 may be moved or relocated.

Figure 8:
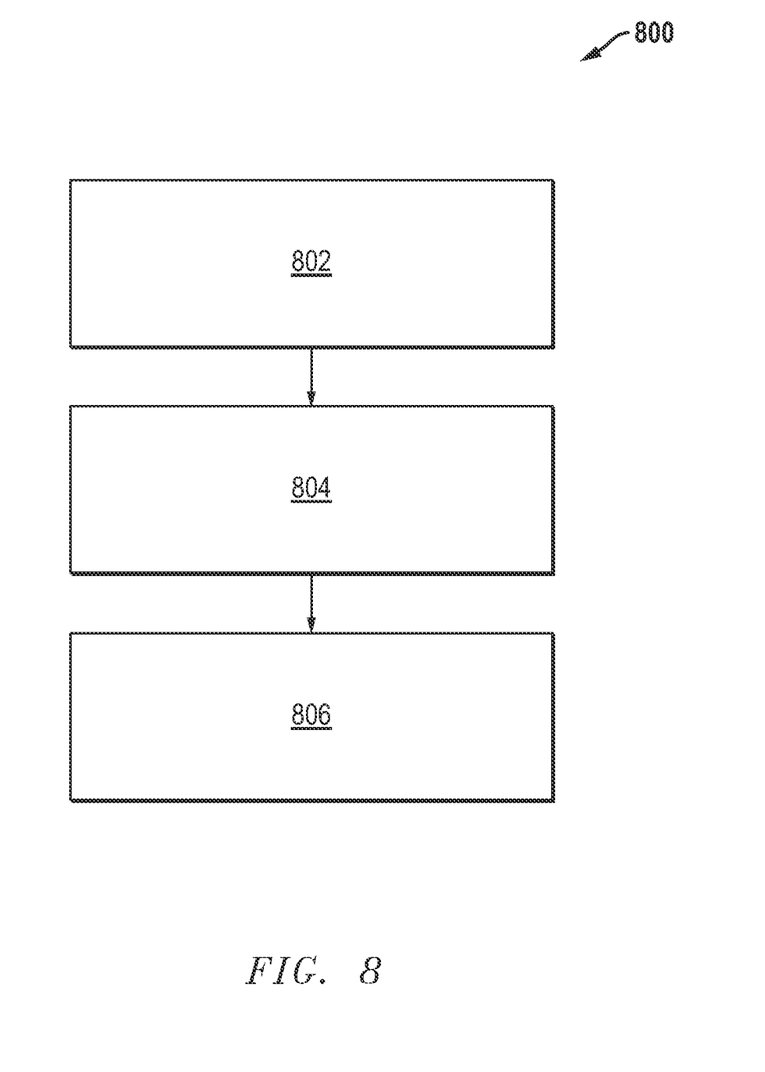
FIG. 8 is a flowchart of a method of operating an irradiation welding apparatus according to an embodiment of the disclosure.

Referring to FIG. 8, a flowchart of a method 800 of operating an irradiation welding apparatus 100 is shown according to an embodiment of the disclosure. The method 800 may begin at block 802 by providing an irradiation welding apparatus 100 comprising an irradiation welding generator 104 having at least one irradiation welding head 138. The method 800 may continue at block 804 by generating an irradiation welding treatment with the irradiation welding generator 104. The method may continue at block 1806 by simultaneously applying the irradiation to a planar area of an end contact surface of a first profile 112 and a planar area of an end contact surface of a second profile 114 with the irradiation welding head 138. The method 800 may continue at block 1106 by manipulating at least one of the first profile 112 and the second profile 114 to force contact between the end contact surface of the first profile 112 and the end contact surface of the second profile 114 to join the first profile 112 and the second profile 114. The method 800 may provide a sterile tube having a first profile 112, a second profile 114, and an irradiation weld integrally joining the first profile 112 and the second profile 114, where the tube has a dimension of greater than 30 mm.

In some embodiments, the method 800 may include one or more of the following: ionizing a flow of gas comprising an inert gas, a hydrocarbon gas, an organic vapor (including PECVD), an oxygen containing gas, a nitrogen containing gas, a fluorine containing gas, or a combination thereof to generate the irradiation welding treatment; sterilizing the internal environment 110 within the operation chamber 102 by applying the irradiation welding treatment within the operation chamber 102; cutting the first profile 112 and the second profile 114 to expose the end contact surfaces of the first profile and the second profile; applying the irradiation welding treatment to the first profile 112 and the second profile 114 prior to cutting the first profile 112 and the second profile 114, wherein the irradiation is applied to the first profile and the second profile at least 1 second, at least 2 seconds, at least 3 seconds, at least 5 seconds, at least 10 seconds, at least 15 seconds at least 30 seconds, at least 45 seconds at least 60 seconds, at least 90 seconds, or at least 120 seconds before cutting the first profile 112 and the second profile 114; and applying the irradiation to the first profile 112 and the second profile 114 after joining the first profile 112 and the second profile 114, wherein the irradiation is applied to the first profile and the second at least 1 second, at least 2 seconds, at least 3 seconds, at least 5 seconds, at least 10 seconds, at least 15 seconds at least 30 seconds, at least 45 seconds at least 60 seconds, at least 90 seconds, or at least 120 seconds after joining the first profile 112 and the second profile 114.

In some embodiments, the method 800 may also include one or more of the following: axially aligning the end contact surfaces of the first profile 112 and the second profile 114 after cutting the first profile 112 and the second profile 114; verifying the axial alignment of the end contact surfaces of the first profile 112 and the second profile 114 via a camera system; monitoring a temperature, a gas flow rate, a gas pressure, a gas detection level, a material of the first profile and the second profile, a irradiation welding treatment progress level, a working cycle, a total number of working cycles, or a combination thereof; displaying the temperature, the gas flow rate, the gas pressure, the gas detection level, the material of the first profile 112 and the second profile 114, the irradiation welding treatment progress level, the working cycle, the total number of working cycles, or a combination thereof on a user interface; alerting a user when an out of conformance condition exists; automatically stopping the irradiation treatment when an out of conformance condition exists, wherein the out of conformance condition may include a low temperature, a high temperature, a low pressure, a high pressure, a low gas flow rate, a high gas flow rate, a detection of a irradiation welding byproduct, an invalid selection of a material, a leak in the operation chamber, or a combination thereof; storing data related to operation of the irradiation welding apparatus 100; conducting a burst test, a tension test, or a combination thereof between the first profile and the second profile test after the first profile and the second profile may be joined; selecting a material of each of the first profile 112 and the second profile 114 via the user interface; and applying a reinforcement at least partially about the coincident weld formed between the first profile and the second profile, wherein the reinforcement may include an adhesive tape, a polymer tape, an overmolded polymer, a welded polymer, or a combination thereof.

Use of the irradiation welding apparatus may provide increased benefits in several applications in fields such as, but not limited to, aerospace, industrial, medical, health care, biopharmaceutical, pharmaceutical, drinking water, food & beverage, laboratory, dairy, or other types of applications. Notably, the use of the irradiation welding apparatus disclosed herein may provide irradiation welding heads that generate localized irradiation at desired positions and treat profile surfaces with more even and precise energy input than existing welding apparatuses known in the art. Further, the use of the irradiation welding apparatus disclosed herein may provide weld tubing of larger sizes than existing welding apparatuses known in the art. Further, the use of irradiation welding apparatus disclosed herein may provide welding of different polymers not available with existing welding apparatuses known in the art, including those not weldable using traditional methods such as thermoset welding. Therefore, irradiation welding apparatuses disclosed herein may provide better performance, increased success rate of welding, simplified assembly and ease of use, and reduced concern for sterility for a user.

Many different aspects and embodiments are possible. Some of those aspects and embodiments are described below. After reading this specification, skilled artisans will appreciate that those aspects and embodiments are only illustrative and do not limit the scope of the present invention.

Embodiment 1: An irradiation welding apparatus comprising: an irradiation welding generator having at least one irradiation welding head configured to apply an irradiation treatment to end contact surfaces of a first profile and a second profile to join the first profile and the second profile, wherein the at least one irradiation welding head forms a planar cross-sectional shape in an x-y directional plane relative to the irradiation welding generator.

Embodiment 2: A method comprising: providing an irradiation welding apparatus comprising an irradiation welding generator having at least one irradiation welding head; generating an irradiation treatment with an irradiation welding generator; simultaneously applying the irradiation treatment to a planar area of an end contact surface of a first profile and a planar area of an end contact surface of a second profile with the irradiation welding head; and manipulating at least one of the first profile and the second profile to force contact between the end contact surface of the first profile and the end contact surface of the second profile to join the first profile and the second profile.

Embodiment 3: A product comprising: a first profile, a second profile, and a irradiation weld integrally joining the first profile and the second profile, wherein the product has a smallest dimension of at least about 10 mm or at least about 20 mm or at least about 30 mm or at least about 40 mm or even at least about 50 mm or at least about 1 mm, such as, at least about 10 mm or at least about 20 mm or at least about 30 mm or at least about 40 mm or at least about 50 mm.

Embodiment 4: The irradiation welding apparatus of embodiment 1, wherein the at least one irradiation welding head faces the end contact surfaces of the first profile and the second profile in the x direction relative to the irradiation welding generator.

Embodiment 5: The irradiation welding apparatus of embodiment 1, wherein the at least one irradiation welding head faces the end contact surfaces of the first profile and the second profile in the y direction relative to the irradiation welding generator.

Embodiment 6: The irradiation welding apparatus of embodiment 1, wherein the at least one irradiation welding head forms a circular cross-sectional shape in the x-y directional plane relative to the irradiation welding generator.

Embodiment 7: The irradiation welding apparatus of embodiment 1, wherein the at least one irradiation welding head forms a polygonal cross-sectional shape in the x-y directional plane relative to the irradiation welding generator.

Embodiment 8: The irradiation welding apparatus of embodiment 1, further comprising at least one blade operatively connected to the at least one irradiation welding head.

Embodiment 9: The irradiation welding apparatus of embodiment 8, wherein the at least one irradiation welding head is located within the blade.

Embodiment 10: The irradiation welding apparatus of embodiment 1, further comprising an operation chamber housing the at least one irradiation welding head.

Embodiment 11: The irradiation welding apparatus of embodiment 10, wherein the operation chamber is configured to form a sterile environment, wherein the sterile environment is defined by reduction in an amount of living microorganisms within the interior environment of the operation chamber by a level of at least $10^6$ after an exposure to the irradiation treatment for at least 10 seconds, at least 15 seconds, at least 20 seconds, at least 25 seconds, or at least 30 seconds.

Embodiment 12: The irradiation welding apparatus of embodiment 10, wherein the operation chamber comprises a ventilation system that provides a two-way air exchange with the operation chamber.

Embodiment 13: The irradiation welding apparatus of embodiment 1, further comprising a gas supply and a power supply.

Embodiment 14: The irradiation welding apparatus of embodiment 13, wherein the gas supply comprises an atmospheric air supply, a compressor, a compressed gas cylinder, an in-house gas line, an in-house compressed gas line, a fan, a turbo, or a combination thereof.

Embodiment 15: The irradiation welding apparatus of embodiment 13, wherein the gas supply provides a flow of gas comprising an inert gas, an oxygen containing gas, hydrocarbon gases, organic vapor, a nitrogen containing gas, a fluorine containing gas, or a combination thereof.

Embodiment 16: The irradiation welding apparatus of embodiment 13, wherein the power supply ionizes the flow of gas to generate the irradiation welding treatment.

Embodiment 17: The irradiation welding apparatus of embodiment 1, wherein the irradiation welding comprises one of microwaves, ultraviolet, x-rays, gamma radiation, alpha radiation, beta radiation, charged ions, neutron radiation, electron radiation, or plasma radiation.

Embodiment 18: The irradiation welding apparatus of embodiment 1, wherein the irradiation welding generator further comprises a supply line coupled to the at least one irradiation welding head.

Embodiment 19: The irradiation welding apparatus, method, or tube of any of the preceding embodiments, wherein at least one of the first profile and the second profile are formed from a polymeric material.

Embodiment 20: The irradiation welding apparatus, method, or tube of any of the preceding embodiments, wherein the first profile and the second profile are formed from a thermoplastic elastomer, a thermoset elastomer, or combination thereof.

Embodiment 21: The tube of embodiment 3, wherein the irradiation weld has an increased surface tension of at least about 1 mN/m, at least about 3 mN/m, or even at least than about 10 mN/m over at least one of the first profile or the second profile.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. An irradiation welding apparatus comprising:
   an irradiation welding generator having at least one irradiation welding head configured to apply an irradiation treatment to end contact surfaces of a first profile and a second profile to join the first profile and the second profile, wherein the at least one irradiation welding head forms a planar cross-sectional shape in an x-y directional plane relative to the irradiation welding generator, further comprising at least one blade operatively connected to the at least one irradiation welding head, wherein the at least one irradiation welding head is located within the blade.

2. The irradiation welding apparatus of claim 1, wherein the at least one irradiation welding head faces the end contact surfaces of the first profile and the second profile in the x direction relative to the irradiation welding generator.

3. The irradiation welding apparatus of claim 1, wherein the at least one irradiation welding head faces the end contact surfaces of the first profile and the second profile in the y direction relative to the irradiation welding generator.

4. The irradiation welding apparatus of claim 1, wherein the at least one irradiation welding head forms a circular cross-sectional shape in the x-y directional plane relative to the irradiation welding generator.

5. The irradiation welding apparatus of claim 1, wherein the at least one irradiation welding head forms a polygonal cross-sectional shape in the x-y directional plane relative to the irradiation welding generator.

6. The irradiation welding apparatus of claim 1, further comprising an operation chamber housing the at least one irradiation welding head.

7. The irradiation welding apparatus of claim 6, wherein the operation chamber is configured to form a sterile environment, wherein the sterile environment is defined by reduction in an amount of living microorganisms within the interior environment of the operation chamber by a level of at least 106 after an exposure to the irradiation treatment for at least 10 seconds, at least 15 seconds, at least 20 seconds, at least 25 seconds, or at least 30 seconds.

8. The irradiation welding apparatus of claim 6, wherein the operation chamber comprises a ventilation system that provides a two-way air exchange with the operation chamber.

9. The irradiation welding apparatus of claim 1, further comprising a gas supply and a power supply.

10. The irradiation welding apparatus of claim 9, wherein the gas supply comprises an atmospheric air supply, a compressor, a compressed gas cylinder, an in-house gas line, an in-house compressed gas line, a fan, a turbo, or a combination thereof.

11. The irradiation welding apparatus of claim 9, wherein the gas supply provides a flow of gas comprising an inert gas, an oxygen containing gas, hydrocarbon gases, organic vapor, a nitrogen containing gas, a fluorine containing gas, or a combination thereof.

12. The irradiation welding apparatus of claim 9, wherein the power supply ionizes the flow of gas to generate the irradiation welding treatment.

13. The irradiation welding apparatus of claim 1, wherein the irradiation welding comprises one of microwaves, ultraviolet, x-rays, gamma radiation, alpha radiation, beta radiation, charged ions, neutron radiation, electron radiation, or plasma radiation.

14. The irradiation welding apparatus of claim 1, wherein the irradiation welding generator further comprises a supply line coupled to the at least one irradiation welding head.

15. The irradiation welding apparatus of claim 1, wherein at least one of the first profile and the second profile are formed from a polymeric material.

16. The irradiation welding apparatus of claim 1, wherein the first profile and the second profile are formed from a thermoplastic elastomer, a thermoset elastomer, or combination thereof.

* * * * *